United States Patent

Bryce

[15] 3,707,148
[45] Dec. 26, 1972

[54] IMPREGNATED DIAPER

[72] Inventor: Douglas Maxwell Bryce, Long Eaton, England

[73] Assignee: Boots Pure Drug Company Limited, Nottingham, England

[22] Filed: June 1, 1970

[21] Appl. No.: 42,522

[30] Foreign Application Priority Data

June 5, 1969  Great Britain.....................28,480/69

[52] U.S. Cl..................................................128/284
[51] Int. Cl................................................A61f 13/16
[58] Field of Search......128/284, 286, 287, 290, 296, 128/156, 270; 424/27–28, 76

[56] References Cited

UNITED STATES PATENTS

| Patent No. | Date | Name | Class |
|---|---|---|---|
| 2,418,907 | 4/1947 | Schreiber | 128/290 R |
| 2,542,909 | 2/1951 | De Wet | 128/290 R |
| 2,602,042 | 7/1952 | Abbott | 424/28 |
| 2,643,969 | 6/1953 | Mahon | 128/284 X |
| 2,837,462 | 6/1958 | Morin | 128/290 R |
| 3,004,895 | 10/1961 | Schwartz | 128/287 X |
| 3,024,207 | 3/1962 | Shaw | 128/290 R |
| 3,082,118 | 3/1963 | Shaw et al. | 128/284 X |
| 3,198,828 | 8/1965 | Matter | 424/27 |
| 3,340,875 | 9/1967 | Dudley et al. | 128/290 R |
| 3,490,454 | 1/1970 | Goldfarb et al. | 128/290 R |

*Primary Examiner*—Charles F. Rosenbaum
*Attorney*—E. J. Berry and L. Rosen

[57] ABSTRACT

Ammonia absorbing products are described which comprise a non-volatile ammonia absorbing agent having a pK value of between 1.8 and 4.5. The agent may be carried in or on a sheet carrier or it may be included in a water permeable sachet. The products are of use as, or as part of, infants' napkins.

13 Claims, No Drawings

IMPREGNATED DIAPER

This invention relates to products designed to absorb the ammonia formed in absorbent materials used to absorb body effluents. We describe the invention mainly in terms of napkins for babies but the invention is equally applicable to, for example, incontinence pads.

The management of infants and others is frequently complicated by the incidence of a rash which is primarily due to the chemical irritation of the skin by ammonia liberated from urine and faeces in the napkin. A major cause of the ammonia in the discharge is degradation of urea in the urine by bacterial ureases produced by faecal organisms such as *Proteus spp.* which are usually present. The irritated skin is ideally suited to support secondary microbiological infections leading to severe irritation, pain and restlessness.

Attempts have been made to reduce the incidence of napkin rash by a number of methods. Thus one method is to treat the napkins during the laundering process with an antibacterial agent such as cetrimide or hexachlorophane with the intention of killing the bacteria which are already present on the napkin and the residuum of the agent left on the napkin is intended to suppress the bacteria when the faeces and urine are passed. Another method is to treat the napkins with vinegar in the final laundry rinse with the intention of absorbing the ammonia as it is formed. Boric acid has also been used to impregnate towel napkins but it is not an efficient absorbent for ammonia and furthermore its use in this manner has been highly criticized since boric acid can be extremely toxic when in direct contact with the skin. Yet another method is to treat the napkins with an anti-ureatic agent, i.e., an agent which inhibits the action of the urease so that ammonia is not formed. For example, napkins have been treated with copper acetylacetonate. Such agents are sometimes used with various additives but in all instances the amounts involved are extremely small. For example, 0.15 mg copper acetylacetonate has been added to a 15g napkin. A further method is to treat laundered napkins with an anti-bacterial agent. None of the methods has been widely adopted because either it is unsatisfactory or it is dependent on treatment in a commercial laundry.

We have now found it possible to reduce or prevent the incidence of napkin rash by providing certain ammonia absorbing products for use as or in association with napkins. In preferred embodiments of the invention the ammonia absorbing agent is provided in such a way that it does not come into direct contact with the skin except as an innocuous solution.

According to the present invention we provide an ammonia absorbing product which comprises a non-volatile ammonia absorbing agent having a pK value of between 1.8 and 4.5 carried, in an amount of at least 1.5 gram per square meter of the product, in or on a sheet carrier or included in a water permeable sachet.

The sheet carrier can be in a number of forms. Thus one example is an ordinary napkin, e.g., a towel napkin or a disposable napkin. Another example is a strip of paper which may be impregnated with the ammonia absorbing agent or a strip of cellulose tape to which the ammonia absorbing agent is secured with an adhesive.

Suitable ammonia absorbing agents which may be used in accordance with the present invention include pharmaceutically acceptable organic acids, which are usually momomeric, such as citric, malic, tartaric, maleic, fumaric, malonic and succinic acids, cellulose derivatives of polybasic acids such as cellulose phosphate, oxidized cellulose, cation exchange resins in the H form or silicic acid gels. The preferred range of pK values for these agents is 2.5 to 4.5.

There are a number of embodiments of the present invention and these include the following ammonia absorbing products:

1. A towel napkin acting as the carrier may be impregnated with the ammonia absorbing material but this is not always very desirable because the impregnation process must be repeated after washing the napkin and this task could not be effectively performed by the layman. Such towels may have a surface area of up to 0.8 square meter, for example they often measure 60 × 60 cm., and may be impregnated with an aqueous solution of, for example, malic acid to deposit at least 0.5 g. and preferably 3 to 4 g. of acid per napkin.

2. The ammonia absorbing agent may be incorporated in a disposable napkin. A disposable napkin is of absorbent material intended to hold the urine. It may comprise a sponge but generally the absorbent material is a textile have a non-woven base that generally consists of or contains a large proportion of cellulose fibers and is generally referred to as cellulose wadding. In such a napkin the wadding is generally 3 mm. thick and usually 5 mm. or more. An ammonia absorbing product of the present invention in which the carrier is in the form of a disposable napkin may simply comprise the absorbent base material and the ammonia absorbing agent but generally the napkin is reinforced on at least one side but may be reinforced on both sides or may in fact be located in a reinforcing envelope. The reinforcement may be integral with the fibrous base, this being achieved, for example, by bonding the surface or surfaces of the fleece. Reinforcement may be performed and then applied to the textile base, for example it may be a net that is applied to the base. Preferably there is a net on both sides of the napkin. In the production of such napkins any reinforcement may be applied to the napkin after the textile base has been formed into the desired shape or the reinforcement may be present on a textile sheet material that is to be cut to shape to form the napkin. The product in which the carrier is in the form of a disposable napkin may be formed initially as a continuous sheet (for example in a continuous roll) but in use it generally has the dimensions of a napkin in which event it should carry at least 0.5 g. of the acid. Disposable napkins are generally substantially rectangular in shape with one side about 1½ to 2¼ times the length of the other side. Thus the long side may be from 20 to 40 cm. but preferably 25 to 35 cm. and usually about 30 cm. while the short side may be from 10 to 25 cm. preferably from 15 to 20 cm. and usually about 18 cm.

The incorporation of the ammonia absorbing agent into a disposable napkin may be accomplished in a number of ways to produce the ammonia absorbing product. The agent may be an integral part of the absorbent material, for example, having been impregnated into the material or coated onto it, or it may be present in granular form dispersed evenly throughout the absorbent material. If the ammonia absorbing agent is a cation exchange resin in sheet form it may be incorporated as such in the body of the napkin. Where the ammonia absorbing agent is in a fibrous form, e.g., cellulose phosphate it may be included in the napkin in the form of woven or non-woven sheets which may be prepared by standard techniques. Such sheets often contain large amounts of other fibers, e.g., cellulose fibers.

3. The ammonia absorbing agent may be carried in or on a disposable napkin liner to produce an ammonia absorbing product. Such liners are intended to allow the urine to pass through to an absorbent material, e.g., towelling, behind it. Liners are generally fairly thin permeable textile sheet materials and may be woven, knitted or, most usually, non-woven. They may be, for example, less than 1 mm. thick and are often of cellulose fibers. Liners are usually not more than 25 × 25 cm. but they may be produced in continuous lengths and carry the ammonia absorbing agent to give a product of the invention in continuous sheet form. Each liner should carry at least 0.5 g of the agent.

4. The ammonia absorbing agent may be carried on a base material in strip or sheet form to give an ammonia absorbing product suitable, e.g., for insertion between a napkin liner and a napkin or a pocket or folds in a towel napkin. Such strips or sheets may also be incorporated in disposable napkins and facilitate the manufacture of the finished product incorporating an ammonia absorbing agent. They may also be integrated with napkin liners. The strips may be manufactured from a continuous roll of material which may be woven, knitted or non-woven and which is from 1 to 25 cm. wide and individual lengths can be cut as required. Non-woven material for this purpose is preferably a paper, for example being made mainly from short cellulose fibers, e.g., less than 10, and preferably less than 5, mm in length, generally by a process in which water is drained from an aqueous slurry of the fibers on a screen. The material is usually thin, e.g., less than 1 mm thick.

Thin material carrying the ammonia absorbing agent may be combined with thicker absorbent at any stage in the manufacture of the final absorbent article. For example a continuous sheet of wadding may have paper carrying the agent continuously laid against it or the wadding may be continuously formed around the thin material and the resulting laminate cut to desired shape subsequently or wadding and the thin material may be cut to shape and then laid together.

When the ammonia absorbing agent is distributed over paper that is within the final absorbent article, as opposed to being a liner, this paper is generally present primarily to provide the ammonia absorbing agent. The paper may be substantially coextensive with the main absorbent, e.g., the wadding of the article or it may cover some areas only of the wadding or other absorbent material. Thus the paper may be in the form of narrow strips which are laid against or into the wadding. For example the paper may be in the form of a strip from 1 to 25 cm. wide.

It is particularly preferred that the housewife should be able repeatedly and easily to produce napkins that are capable of absorbing ammonia and this can be achieved by providing the housewife with a roll of the paper carrying the absorbent agent with the result that she can tear off a suitable length of paper to prepare each napkin or to provide her with a container, e.g., a box, containing interleafed sheets of the paper.

The ammonia absorbing agent may be incorporated with the sheet carrier in any convenient manner. For example acids that are soluble in water or other convenient solvents may be impregnated as a solution into absorbent sheet carrier, optionally as the last stage in the manufacture of the carrier which is then dried to give a uniformly impregnated material. For example, aqueous solutions of citric or tartaric acid may be used.

Certain acids which are used as ammonia absorbing agents in the invention may conveniently be applied as a coating on a thin material. Thus the material may be dipped into molten acid or molten acid may be sprayed on to it. The acid then solidifies as it cools. It may be desirable to include a plasticizer for the acid in the melt in order to produce a more flexible coated material.

5. The ammonia absorbing product may be formed by sealing a quantity of the ammonia absorbing agent in a water permeable sachet, formed from, for example, polyvinyl alcohol. Such a sachet may be inserted for example in a pocket or within the folds of a towel napkin; or it may be incorporated within an absorbent napkin. Each sachet preferably contains at least 0.5 g. of the agent, and preferably at least 1 g., and usually at least 2 g. or even 3 g. of the agent.

The urine and faecal discharge in soiled napkins normally contains up to 0.65% w/w of ammonia but when treated with urease the total ammonia content rises to an average of 1.2% w/w. This concentration of ammonia is the maximum which one would reasonably expect in practice. A soiled napkin which has absorbed the average volume of 150 ml. of urine may therefore produce up to 1.8 g. of ammonia. The amounts of various acids required to neutralize the potential ammonia content of urine were found by titrating ammonia to ph 5.5. using a glass electrode pH meter and the results are summarized in the following table.

| Acid | Wt. of acid (g.) equiv. to 1g. $NH_3$ titrated to pH 5.5 |
| --- | --- |
| Citric | 4.2 |
| Malic | 3.4 |
| Maleic | 4.6 |
| Malonic | 3.6 |
| Succinic | 3.8 |
| Tartaric | 4.2 |
| Fumaric | 3.5 |

We prefer to use citric or malic acid as the ammonia absorber and we have found that in practice the incidence of napkin rash caused by the presence of relatively large quantities of ammonia is reduced by using about 4 g. of citric acid or 3.5 g. of malic acid with a napkin.

The time a soiled napkin is in contact with the skin will have some bearing on the incidence of napkin rash and in laboratory experiments it was found possible to prevent the evolution of ammonia over a period of 6 hours, during which period the napkins were lightly pressed occasionally, by treating the napkin with only 2.5% w/w of malic acid based on a 20 g. napkin.

By including at least 0.5 g. of the ammonia absorbing agent in a napkin or at least 1.5 g. per square meter of an absorbent material which may be cut to the dimensions of a napkin, it is possible to absorb a significant amount of the ammonia that will be evolved during normal usage. The optimum amount naturally depends upon the particular agent being used. When the agent is an ion exchange resin the amounts are of course greater than when the agent is an acid such as malic acid.

In practice we generally have at least 1 g. and often at least 2 g. or even at least 3 g. of organic acid in each napkin. For a disposable napkin measuring 30 × 18 cm. these quantities are equivalent to about 20 g., 40 g. and 60 g. per square meter respectively, the area being the surface area of one side of the napkin. By using such amounts it is possible substantially to eliminate the evolution of ammonia collected in the napkin during normal usage over a 6 hour period.

It is to be understood that the ammonia absorbing material may be used in conjunction with the other additives for reducing napkin rash, e.g., bactericides and enzyme inhibitors which are pharmaceutically acceptable and also compatible with the ammonia absorbers. Typical of such bactericides are phenylmercuric salts such as phenylmercuric nitrate and phenylmercuric acetate. Bronopol has also been found to be useful in conjunction with, e.g., malic or citric acid and the amount of acid may be reduced. Bronopol is 2-bromo-2-nitropropane-1,3-diol.

In constructing a napkin from an absorbent material containing the ammonia absorbing agent, it is of course necessary to consider the dermatological effect of the particular agent being used. It is preferred that the agent should be dermatologically acceptable, that is to say that it should be non-irritant and non-toxic both in solid form and solution but it is adequate in most constructions of napkins if it is merely dermatologically acceptable in solution in urine. Thus if it is dermatologically unacceptable and is enclosed in a water soluble sachet or absorbed on a strip of paper it will only come into contact with the skin when in solution after absorbing ammonia and this would be satisfactory.

The following non-limitative examples illustrate the invention:

EXAMPLE 1

A rectangular portion of cellulose wadding (20 g.; 30 cm. × 18 cm.) was treated with a solution of citric acid (4g.) in isopropanol and dried. The treated wadding was covered with a 30 cm. × 18 cm. rectangular piece of cotton wool (5 g.) and used as a disposable napkin with the cotton wool in contact with the skin.

Similar napkins were prepared using water or ethanol as the solvent for the citric acid.

EXAMPLE 2

Disposable napkins were made in a similar way to that described in Example I but using tartaric acid (4 g.), malic acid (3.5 g.) or fumaric acid (3.5 g.) to impregnate the cellulose wadding.

EXAMPLE 3

A disposable napkin was prepared from a rectangular portion of cellulose wadding (20 g.; 30 cm. × 18 cm.) and above the wadding was placed at equal distances four strips of absorbent paper 25 cm. × 2.5 cm., each strip being impregnated with an aqueous solution of malic acid so that each strip contained 1 g. of acid. The absorbent wadding and treated strips were enclosed in a fabric envelope and when treated with 100 ml. of artificial urine containing urease the evolution of free ammonia was prevented for a period in excess of 6 hours.

EXAMPLE 4

A disposable napkin was prepared from a rectangular portion of cellulose wadding (20 g.; 30 cm. × 18 cm.) and above the wadding was placed at equal distances four strips of absorbent paper 25 cm. × 2.5 cm., each strip containing 0.5 g. of malic acid and 0.625 mg. of Bronopol. The absorbent wadding and the treated strips were enclosed in a fabric envelope.

EXAMPLE 5

A continuous length of absorbent paper was impregnated with a solution of malic acid and Bronopol at a rate of 66 g/m$^2$ malic acid and 83 mg/m$^2$ Bronopol, and was dried. Parts of this were treated in different ways. One part was cut into sheets 20 cm. × 15 cm. which were interleafed and packed in a box. One part was cut longitudinally into strips 20 cm. wide and perforated every 15 cm., each strip then being wound as a roll. Another part was cut into strips 2.5 cm. wide, part of this then being cut into 15 cm. lengths and part being wound on a roll.

One napkin can be made up using 6 of these strips 2.5 cm. × 20 cm. Thus they may be placed in the folds of an ordinary towel napkin or in a specially prepared pocket therein, or they may be placed between a napkin liner and a napkin or they may be attached to a napkin liner for use in conjunction with a napkin or they may be incorporated in a disposable napkin.

EXAMPLE 6

2 g. of malic acid and 2.5 mg. of Bronopol were enclosed within a sachet made from polyvinyl alcohol. This sachet was placed in the folds of a towel napkin. In place of the 2 g. of malic acid and the Bronopol there was also made a sample comprising 4 g. of malic acid. Citric acid could be used for these examples in place of the malic acid.

EXAMPLE 7

Disposable napkins were made as described in Example 1 but replacing the malic acid with 10 g. of granules of Zeokarb 225 resin (Trade Name) or a similar quantity of Amberlite IRC 50 resin (Trade Name) in the H° form. The granules were sprinkled evenly across the full area of the cellulose wadding absorbent. When the napkins absorbed 100 ml. each of a synthetic urine containing urea and urease, free ammonia was present after 30 minutes as shown by a pH of 9 compared with an original pH of 5.5.

I claim:

1. A baby's napkin comprising a material that will absorb liquid, at least 2 grams of a monomeric organic acid as an ammonia absorbing agent and having a pK value of from 1.8 to 4.5, and 2-bromo-2-nitropropane-1,3-diol.

2. A napkin according to claim 1 in which the material that will absorb liquid is towelling.

3. A napkin according to claim 1 in which the material that will absorb liquid is cellulose wadding at least 3 mm thick.

4. A napkin according to claim 1 in which the ammonia absorbing agent is impregnated into or coated onto the material that will absorb liquid.

5. A napkin according to claim 1 including a napkin liner and in which the ammonia absorbing agent is in or on the napkin liner.

6. A napkin according to claim 1 in which the ammonia absorbing agent is in or on paper.

7. A napkin according to claim 1 in which the ammonia absorbing agent is in a water permeable sachet.

8. A napkin according to claim 1 in which the ammonia absorbing agent is a monomeric organic acid selected from the group consisting of citric acid, malic acid, maleic acid, malonic acid, succinic acid, tartaric acid and fumaric acid.

9. A napkin according to claim 1 additionally comprising a urease.

10. A napkin according to claim 1 in which the ammonia absorbing agent is in or on a sheet carrier.

11. A sheet carrier suitable for use in a napkin according to claim 10 and comprising a permeable textile base less than 1 mm thick and having one dimension of from 20 to 40 cm and the other dimension of from 10 to 25 cm and comprising at least 2 g of a monomeric organic acid as ammonia absorbing agent and having a pK value of 1.8 to 4.5, and 2-bromo-2-nitropropane-1,3-diol.

12. A sheet carrier suitable for use in a napkin according to claim 10 and comprising a roll of a permeable textile less than 1 mm thick, the roll being less than 25 mm wide, and comprising at least 40 grams per square meter of a monomeric organic acid as an ammonia absorbing agent and having a pK value of from 1.8 to 4.5, and 2-bromo-2-nitropropane-1,3-diol, the textile being capable of serving as a napkin liner.

13. A sheet carrier suitable for use in a napkin according to claim 10 and comprising a strip of paper from 1 to 25 cm wide and less than 1 mm thick and formed from short cellulose fibers and comprising at least 40 grams per square meter of a monomeric organic acid as an ammonia absorbing agent and having a pK value of from 1.8 to 4.5 and 2-bromo-2-nitropropane-1,3-diol.

* * * * *